United States Patent
Kaneko (10) Patent No.: US 6,681,980 B2
(45) Date of Patent: Jan. 27, 2004

(54) STRUCTURE OF SOLDERING IRON TIP

(75) Inventor: Toru Kaneko, Iwata-gun (JP)

(73) Assignee: Minebea Co., Ltd., Kitasaku-gun (JP)

(*) Notice: Subject to any disclaimer, the term of this patent is extended or adjusted under 35 U.S.C. 154(b) by 0 days.

(21) Appl. No.: 10/125,361

(22) Filed: Apr. 19, 2002

(65) Prior Publication Data

US 2002/0153404 A1 Oct. 24, 2002

(30) Foreign Application Priority Data

Apr. 20, 2001 (JP) ........................................ 2001-122649

(51) Int. Cl.[7] .............................................. B23K 1/002
(52) U.S. Cl. ............................. 228/14; 228/55; 219/229
(58) Field of Search ............................. 228/14, 54, 55; 219/229, 230, 231, 232, 233, 234, 235, 236, 237, 238, 239

(56) References Cited

U.S. PATENT DOCUMENTS

| 2,790,058 A | * | 4/1957 | De Verrier et al. ........... 228/18 |
| 3,580,462 A | * | 5/1971 | Vanyi ........................... 228/51 |
| 4,473,946 A | * | 10/1984 | Hill ............................... 30/140 |
| 5,482,199 A | * | 1/1996 | Walker ......................... 228/52 |

FOREIGN PATENT DOCUMENTS

| CH | 380495 | 7/1964 |
| DE | 7739300 | 4/1978 |
| DE | 8515001.0 | 10/1986 |
| JP | A 61-42481 | 2/1986 |
| JP | A 4-17974 | 1/1992 |
| JP | A 10-58137 | 3/1998 |

* cited by examiner

Primary Examiner—M. Alexandra Elve
Assistant Examiner—Len Tran
(74) Attorney, Agent, or Firm—Oliff & Berridge, PLC (57) ABSTRACT

A tip of a soldering iron is provided which separates any solder bridge, sucks up excess solder, and performs normal soldering operation. The tip has a cutter blade-like portion with its edge inclined. Grooves are formed on both side surfaces of the cutter blade-like portion. Solder guides extend along the grooves, and cylindrical through-holes penetrating the tip are formed at the ends of the grooves closer to an iron handle. When the cutter blade-like portion is applied to a solder bridge, solder is melted, and sucked up from the solder guides through the grooves by capillary action. Excess melted solder is collected to be stored by its surface tension.

9 Claims, 6 Drawing Sheets

STRUCTURE OF SOLDERING IRON TIP

BACKGROUND OF THE INVENTION

1. Field of the Invention

The present invention relates to a structure of a soldering iron tip, and more particularly to a structure of a soldering iron tip adapted to easily remove a solder bridge.

2. Description of the Related Art

In soldering electronic parts on a circuit board, a soldering defect such as a solder bridge, which causes terminals to be short-circuited, sometimes occurs and needs to be removed. However, it is getting difficult to remove the solder bridge because circuit patterns arm becoming finer and finer recently.

For solving the above problem, for example, a soldering iron for both soldering and removing a solder (herinafter referred to as desoldering iron) is disclosed in Japanese Unexamined Patent Application Publication No. Hei 10-58137. The tip of the desoldering iron is shaped rectangular in cross section, has through-holes as solder reservoirs for storing sucked solder, and has solder suction grooves formed on both opposite side surfaces thereof and extending from rims of respective through-holes toward an edge of the tip.

The desoldering iron tip is structured such that solder melted by heat is sucked into the through-holes by capillary action through the solder suction grooves formed in the tip, thereby removing the solder of a solder bridge. However, the desoldering iron is not adapted to cut off a solder bridge, and it is difficult to cut off a solder bridge formed in a narrow area between terminals or a solder bridge formed between terminals of through-hole devices so as to remove the solder. Furthermore, conventional low-melting-point eutectic lead solder (having a melting point of 183° C.) contains lead and has therefore not been used recently because circuit boards with the solder discarded as industrial waste pollute the environment.

In recent years, lead-free solder has been taking the place of the eutectic lead solder. While the lead-free solder has the advantage of not containing lead, its melting point is 220° C. to 230° C., which is higher than that of the eutectic lead solder. For this reason, soldering work and removal of a solder bridge are performed with the temperature of the soldering iron tip set approximately 20° C. to 30° C. higher than conventionally. However, when the temperature of the tip is increased by 20° C. to 30° C. compared with conventionally, thermal stress is imposed on the circuit boards, and conductive patterns are peeled off the circuit boards.

SUMMARY OF THE INVENTION

The present invention has been made to overcome the above problems, and an object of the invention is to provide a soldering iron tip which has a function of separating a solder bridge, a desoldering function of sucking up unnecessary solder of the separated solder bridge, and a normal function of performing soldering even with a high-melting-point solder.

In order to achieve the above object, according to a first aspect of the present invention, a soldering iron tip is provided which has an edge inclined with respect to a main axis extending from the edge toward a handle, and solder suction grooves (hereinafter referred to as grooves) formed in a cutter blade-like portion and oriented parallel to the main axis.

According to a second aspect of the present invention, the grooves are formed on both side surfaces of the edge opposite to each other.

According to a third aspect of the present invention, vertex ages formed respectively between the main axis and the side surfaces of the inclined edge are different from each other.

According to a fourth aspect of the present invention, the two grooves positioned opposite to each other have a V-shaped notch formed at the edge of the cutter blade-like portion.

According to a fifth aspect of the present invention, the grooves each have a cylindrical through-hole for storing solder, which is formed at one end thereof closer to the handle, and which goes through the tip from one side surface to the other side surface.

According to a sixth aspect of the present invention, a plurality of grooves are formed on each of the both side surfaces.

According to a seventh aspect of the present invention, the grooves have any one of V, U, and arc shapes in section.

According to an eighth aspect of the present invention, the edge of the cutter blade-like portion is plated so that plating covers an area beyond each of the grooves, and, in case of the cylindrical through-holes for storing solder being provided, covers an area beyond each of the through-holes.

According to a ninth aspect of the present invention, the grooves each have a solder guide therealong.

BRIEF DESCRIPTION OF THE DRAWINGS

FIGS. 1A to 1C show the structure of a first embodiment of the present invention.

FIGS. 2A to 2C show the structure of a second embodiment of the present invention.

FIGS. 3A to 3C show the structure of a third embodiment of the present invention.

FIGS. 4A to 4C show the structure of a fourth embodiment of the present invention.

FIGS. 5A to 5C show the structure of a fifth embodiment of the present invention.

FIGS. 6A to 6C show the structure of a sixth embodiment of the present invention.

DESCRIPTION OF THE PREFERRED EMBODIMENTS

Embodiments of the present invention will be described below with reference to the drawings.

A first embodiment of the present invention will be explained with FIGS. 1A to 1C.

Figure 1A:
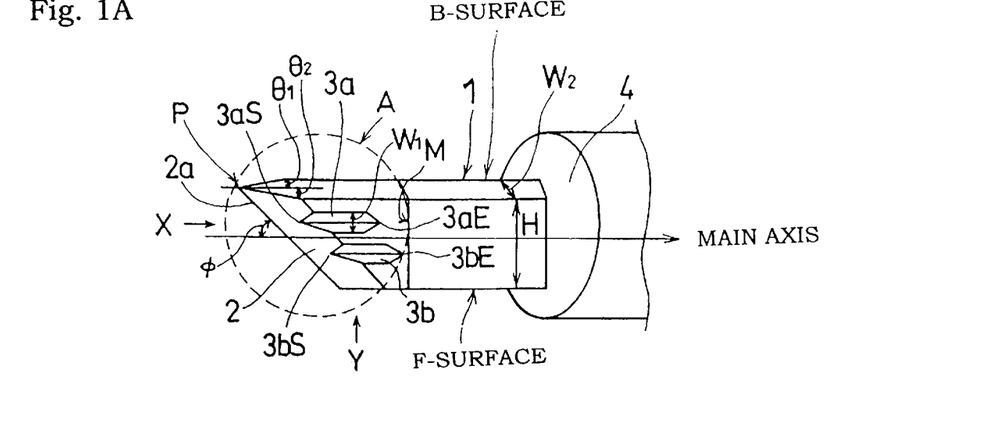
FIG. 1A is an external perspective view of a tip and a heater section.

Referring to FIG. 1A, a soldering iron tip 1 is inserted in a heater section 4 having a heater (not shown) therein, and fixed thereto by a predetermined method. The heater section 4 is attached to a handle (not shown). The tip 1 is heated electrically via the heater section 4. The tip 1 is plated, by a known method, with a material having a poor wettability with respect to solder, such as iron or hard chrome. A portion between an edge 2a of a blade section 2 and a point M portioned beyond solder suction grooves, which will be described later, is plated with a material having a good wettability with respect to solder, such as solder or pure iron.

The tip 1 is shaped like a cutter blade such that the edge 2a of the blade section 2 is inclined at an angle φ to a main axis which extends from the edge 2a toward the handle. V-shaped solder suction grooves (to be called grooves) 3a and 3b are formed parallel to the main axis. Excess solder which forms a solder bridge is melted and sucked up into the grooves 3a and 3b by capillary action. The blade section 2 has an angle consisting of angles θ1 and θ2 made with the main axis. A point end P of the edge 2a of the blade section 2 is positioned at the center of the width W2 of the tip 1, and the angles θ1 and θ2 are equal to each other.

Figure 1B:
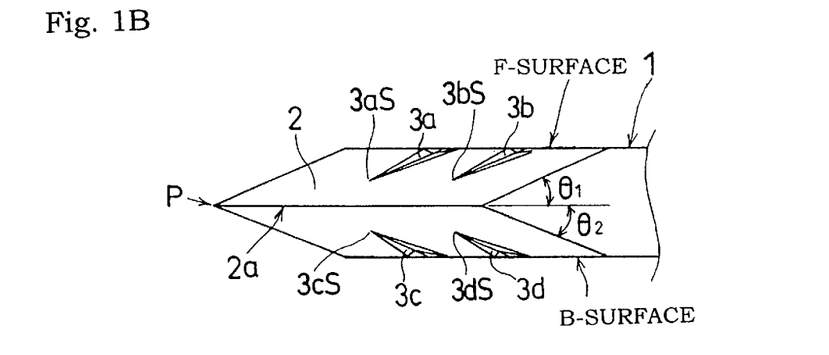
FIG. 1B is an enlarged view of Section A shown in FIG. 1A as viewed from the Y-direction.

In FIG. 1B, the grooves 3a and 3b, and grooves 3c and 3d are formed on an F-surface and a B-surface of the blade section 2, respectively. One ends 3aS, 3bS, 3cS, and 3dS of the grooves 3a, 3b, 3c, and 3d do not reach the edge 2a of the blade section 2.

As shown in FIG. 1A, the other ends 3aE, 3bE, 3cZ, and 3dE of the grooves 3a, 3b, 3c, and 3d extend halfway on the tip 1 beyond the blade section 2. The length, depth, and angle θ3 of respective grooves 3a, 3b, 3c, and 3c are determined in accordance with the electric power of the soldering iron so that solder can be easily sucked up. The angles θ1 and θ2 made respectively between the main axis and the side surfaces of the blade section 2 are determined in consideration of a distance between leads in a semiconductor integrated circuit, the thickness of a solder bridge, and the like.

Figure 1C:
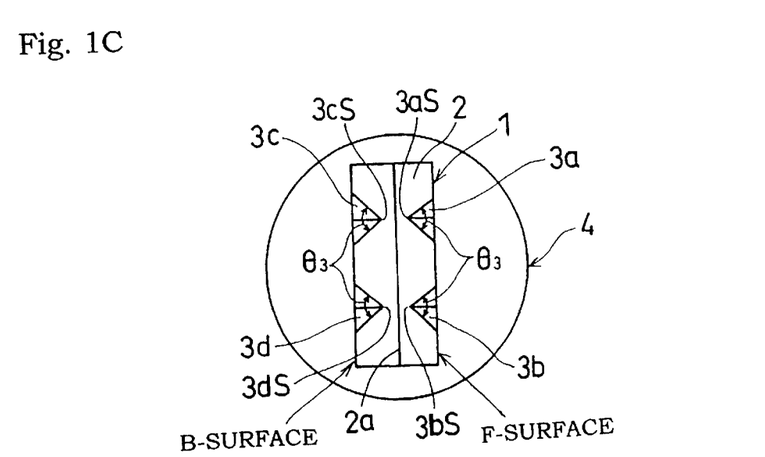
FIG. 1C is an enlarged view of Section A shown in FIG. 1A as viewed from the X-direction.

In FIG. 1C, vertex angle θ3 of the grooves 3a, 3b, 3c, and 3d is determined in consideration of such factors as smooth suction of solder or prevention of the solder from falling off the tip 1, the electric power of the soldering iron and the viscosity of the solder to be used. The tip 1 which has the edge 2a of the blade section 2 inclined at the angle φ and the grooves 3a, 3b, 3c, and 3d, work as follows. The tip 1 is heated by the electric power supplied from the power supply (not shown) via the heater section 4. With the tip 1 heated, the edge 2a of the blade section 2 is applied to a solder bridge. The tip 1 with the edge 2a inclined at the angle φ can be easily guided between leads in an integrated circuit, whereby the solder is heated and melted. Since the edge 2a of the blade section 2 has the angles of θ1 and θ2, the solder bridge can be easily separated. The separated solder is sucked up into the grooves 3a, 3b, 3c, and 3d by capillary action.

A second embodiment of the present invention will be explained by FIGS. 2A to 2C.

Figure 2A:
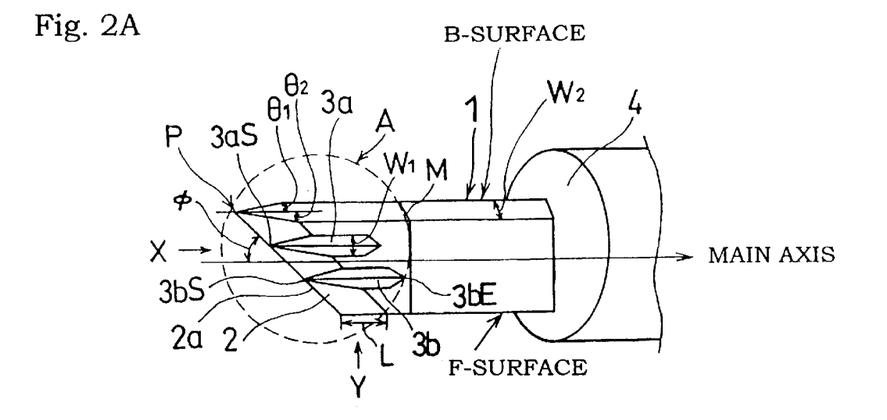
FIG. 2A is an external perspective view of a tip 1 and a heater section 4.
Figure 2B:
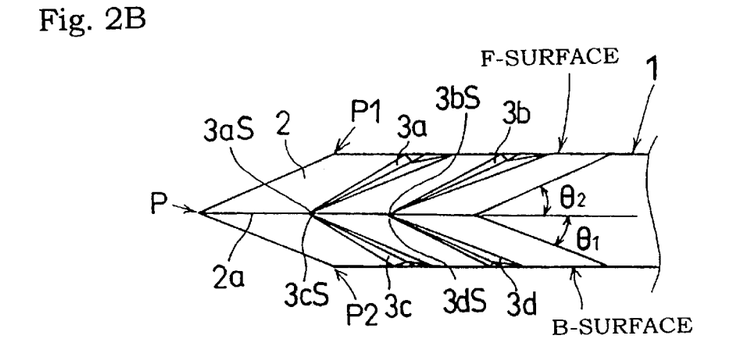
FIG. 2B is an enlarged view of Section A shown in FIG. 2A as viewed from the Y direction.
Figure 2C:
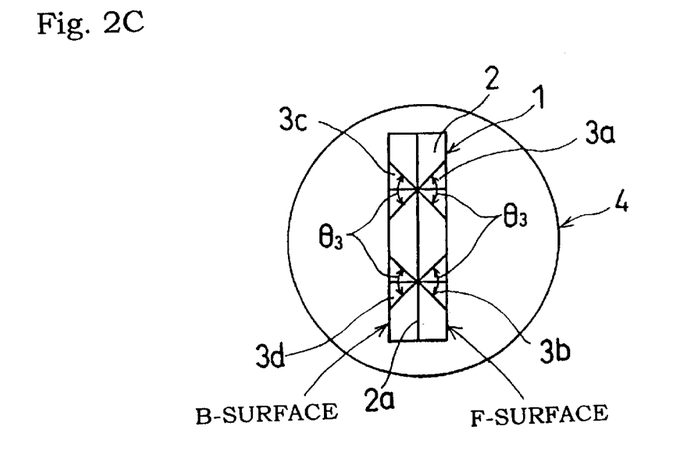
FIG. 2C is an enlarged view of Section A shown in FIG. 2A as viewed from the X-direction.

In FIGS. 2A to 2C, the same components as those in FIGS. 1A to 1C are denoted by the same reference numerals, and descriptions thereof are omitted. The difference from the first embodiment is that while the one ends 3aS, 3bS, 3cS, and 3dS of the grooves 3a, 3b, 3c, and 3d do not reach the edge 2a of the blade section 2 in the first embodiment per FIGS. 1A to 1C, one ends 3aS, 3bS, 3cS, and 3dS of grooves 3a, 3b, 3c, and 3d reach a edge 2a of a blade section 2 in the second embodiment per FIGS. 2A to 2C. The width of the grooves 3a, 3b, 3c, and 3d increases at a predetermined angle from the edge 2a of the blade section 2 toward the handle so as to reach the width W1. That is, solder which is melted and separated comes immediately into contact with the grooves 3a, 3b, 3c, and 3d to be sucked up thereinto by capillary action.

Since the one ends 3aS, 3bS, 3cS, and 3dS of the grooves 3a, 3b, 3c, and 3d reach the edge 2a of the blade section 2, the following result can be achieved. When removing a solder bridge with a large amount of solder using a soldering iron having a small power capacity, the temperature of the soldering iron tip decreases, or when using a lead-free solder having a high-melting-point, the effect of the capillary action for sucking up solder is lowered. However, since the one ends 3aS, 3bS, 3cS, and 3dS of the grooves 3a, 3b, 3c, and 3d reach the edge 2a of the blade section 2 as described above, the solder can be promptly sucked up even when the viscosity of the solder increases due to a decrease in the temperature of the tip 1.

Figure 3A:
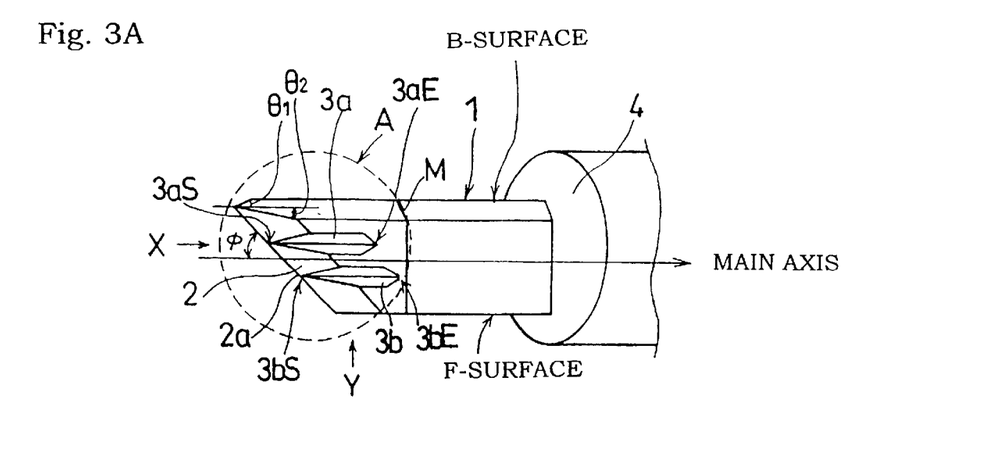
FIG. 3A is an external perspective view of a tip 1 and a heater section 4.
Figure 3B:
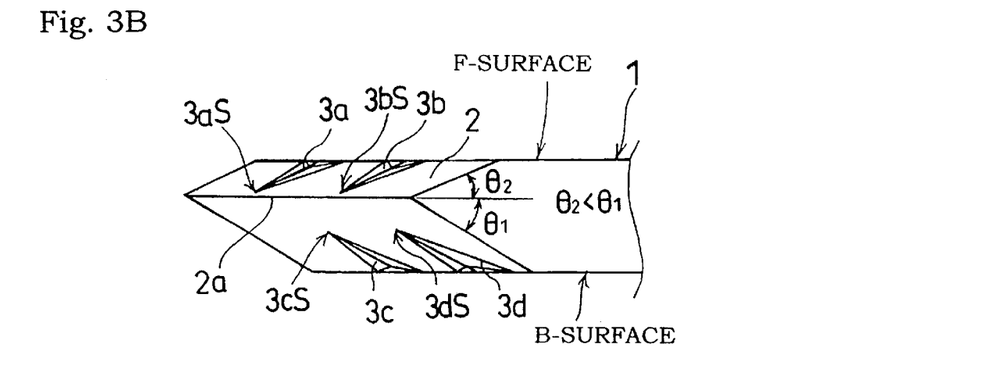
FIG. 3B is an enlarged view of Section A shown in FIG. 3A as viewed from the Y-direction.
Figure 3C:
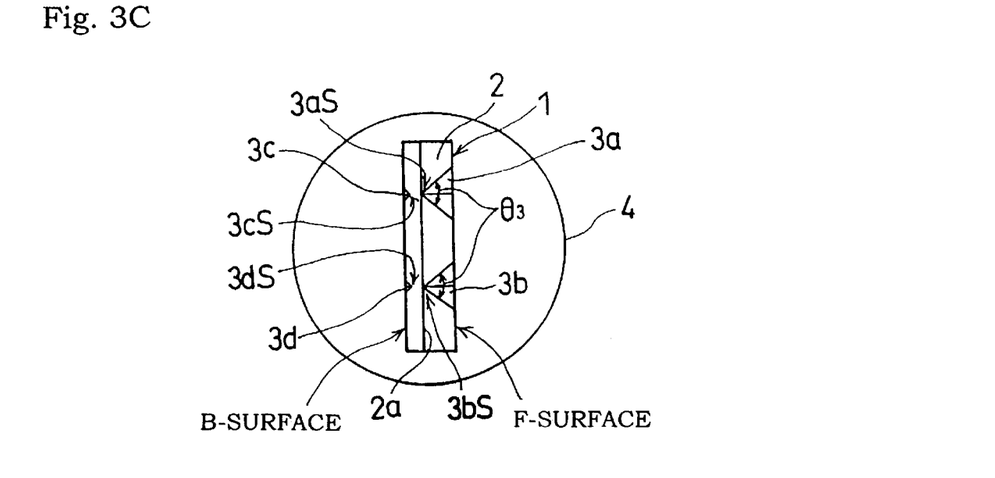
FIG. 3C is an enlarged view of Section A shown in FIG. 3A as viewed from the X-direction.

A third embodiment of the present invention rill be explained by FIGS. 3A to 3C.

In FIGS. 3A to 3C, the same components as those in FIGS. 1A to 1C are denoted by the same reference numerals, and descriptions thereof are omitted. The third embodiment is different from the first and second embodiments in that angles θ1 and θ2 at an edge 2a of a blade section 2 are different from each other, and that while one ends 3cS and 3dS of grooves 3c and 3d do not reach the edge 2a of the blade section 2, one ends 3aS and 3bS of grooves 3a and 3b reach the edge 2a. The position of a point end P of the edge 2a and the angles θ1 and θ2 thereat arm determined as follows. A first method is to designate the width of the tip 1 as W2, and determine the angle of the blade section 2 so that the edges of the blade section 2 can extend from an arbitrary point within the width W2 at the angles θ1 and θ2 to an F-surface and a B-surface. A second method is to determine the position of the end P so that the angles θ1 and θ2 can be made between opposite points P1 and P2 on the F-surface and the B-surface of the tip 1 and the edge 2a of the blade section 2. Choice of the two methods is made in consideration of the width W2 of the lip 1, the electric power of the soldering iron, and the like.

Since while the one ends 3cS and 3dS of the grooves 3c and 3d do not reach the edge 2a of the blade section 2, the one ends 3aS and 3bS of the grooves 3a and 3b reach the edge 2a, the following result can be achieved. When soldering is performed by applying solder to the F-surface with a smaller angle, the solder flows down through the grooves 3a and 3b, and reaches the edge 2a in a manner reversed to when removing a solder bridge. Since the angle of the F-surface is small, soldering can be easily performed even in a narrow space between leads in an integrated circuit.

A fourth embodiment of the present invention will be explained by FIGS. 4A to 4C.

Figure 4A:
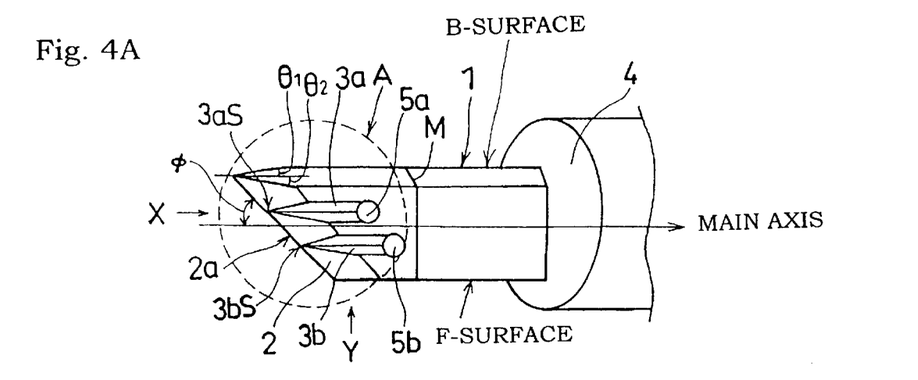
FIG. 4A is an external perspective view of a tip 1 and a heater section 4.
Figure 4B:
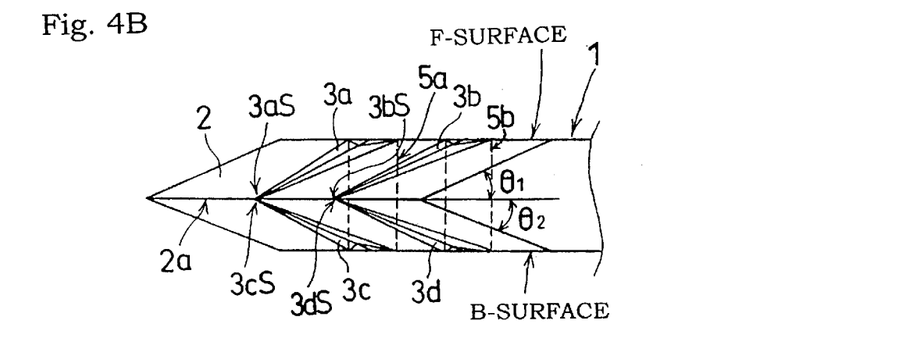
FIG. 4B is an enlarged view of Section A shown in FIG. 4A as viewed from the Y-direction.
Figure 4C:
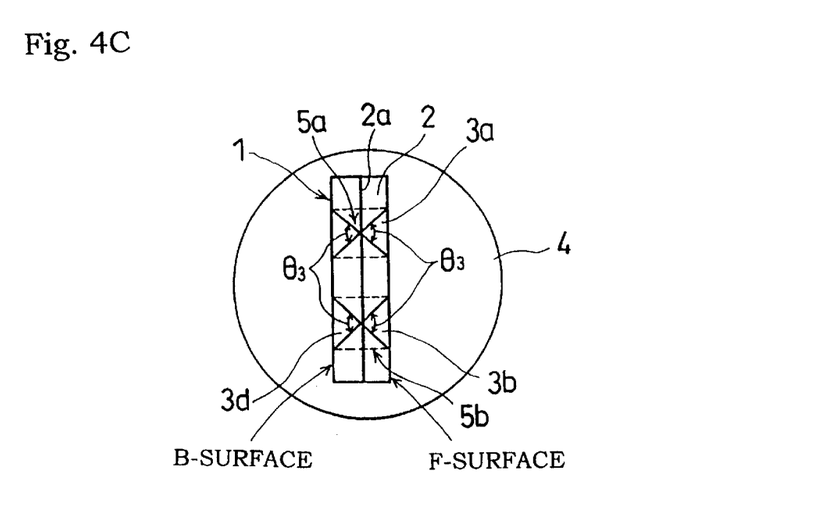
FIG. 4C is an enlarged view of Section A shown in FIG. 4A as viewed from the X-direction.

In FIGS. 4A to 4C, the same components as those in FIGS. 2A to 2C are denoted by the same reference numerals, and descriptions thereof are omitted. The fourth embodiment is different from the second embodiment per FIGS. 2A to 2C in that one ends 3aS, 3bS, 3cS, and 3dS of grooves 3a, 3b, 3c, and 3d reach an edge 2a of a blade section 2, and that other ends 3aE, 3bE, 3cE, and 3dE of the grooves 3a, 3b, 3c, and 3d are provided with cylindrical through-holes 5a and 5b as reservoirs for storing solder (to be called through-holes). The through-holes 5a and 5b go through a tip 1 from a B-surface to an F-surface. A portion between the edge 2a and a point M positioned beyond the through-holes 5a and 5b is plated with a material having a good wettability with respect to solder, such as solder or pure iron.

The diameter of each of the through-holes 5a and 5b is set to be slightly larger than the width of the grooves 3a, 3b, 3c, and 3d so that solder sucked up through the grooves 3a, 3b, 3c, and 3d can remain therein by surface tension without flowing back into the grooves 3a, 3b, 3c, and 3d. By forming the through-holes 5a and 5b, the solder sucked up through the grooves 3a and 3c, and the solder sucked up through the grooves 3b and 3d are adapted to be stored in the through-holes 5a and 5b, respectively.

A fifth embodiment of the present invention will be explained by FIGS. 5A to 5C.

Figure 5A:
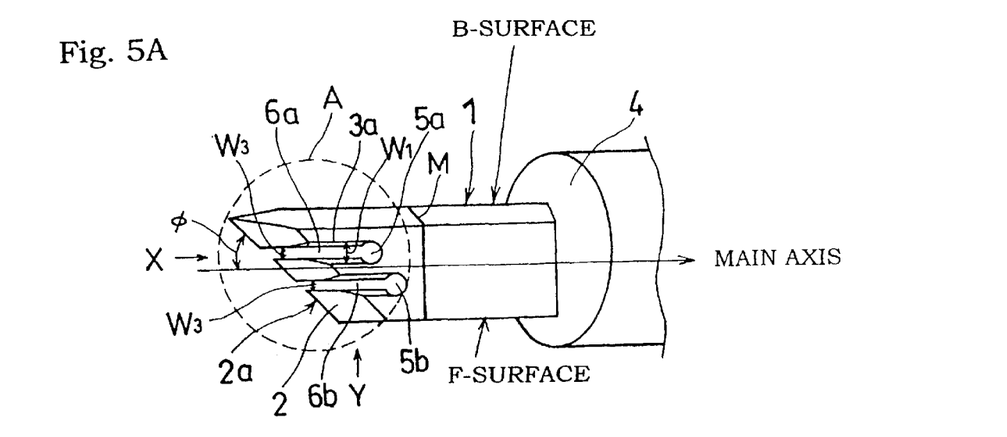
FIG. 5A is an external perspective view of a tip 1 and a heater section 4.
Figure 5B:
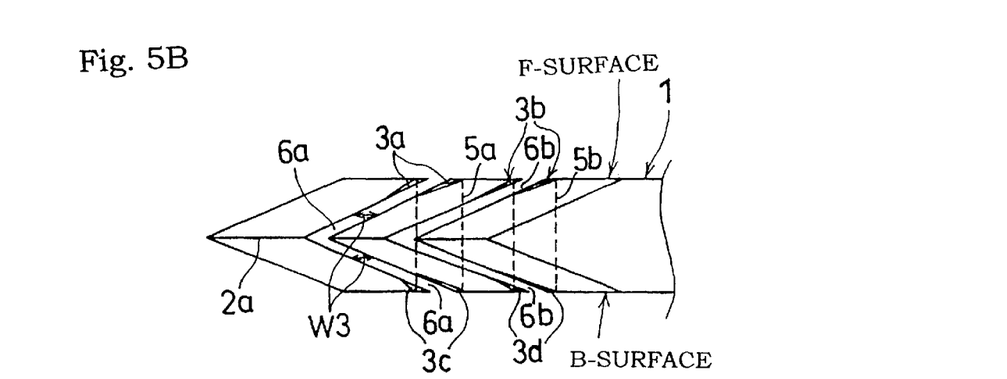
FIG. 5B is an enlarged view of Section A shown in FIG. 5A as viewed from the Y-direction.
Figure 5C:
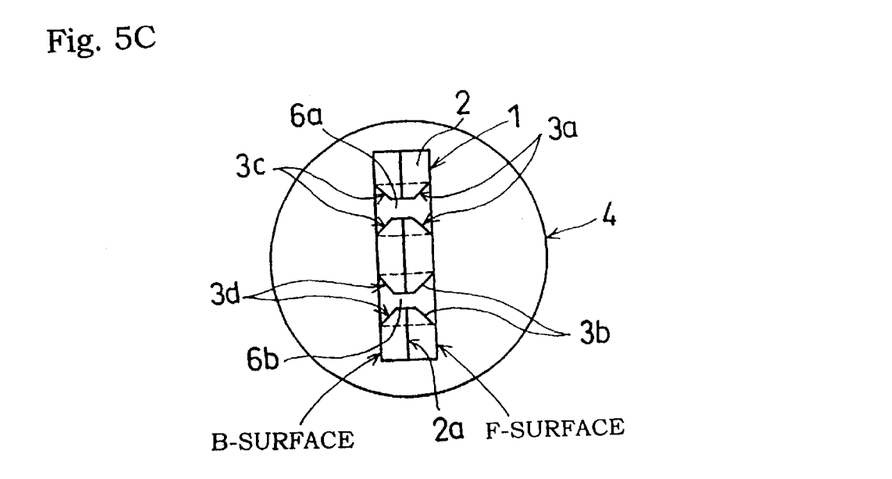
FIG. 5C is an enlarged view of Section A shown in FIG. 5A as viewed from the X-direction.

In FIGS. 5A to 5C, the same components as those in FIGS. 4A to 4C are denoted by the same reference numerals, and descriptions thereof are omitted. The fifth embodiment is different from the fourth embodiment per FIGS. 4A to 4C in that grooves 3a, 3b, 3c, and 3d are provided with solder guides 6a and 6b. The solder guides 6a and 6b extend along the grooves 3a, 3b, 3c, and 3d from an edge 2a of a blade section 2 to through-holes 5a and 5b, and go through a tip 1 from a B-surface to an F-surface, and a portion of the blade section 2 between the edge 2a and a point M positioned beyond the through-holes 5a and 5b is plated with a material having a good wettability with respect to solder, such as solder or pure iron.

A width W3 of the solder guides 6a and 6b is set to be slightly smaller in the width W1 of the grooves 3a, 3b, 3c, and 3d so that solder sucked up through the solder guides 6a and 6b by capillary action can spread and flow smoothly into the grooves 3a, 3b, 3c, and 3d. The diameter of the through-holes 3a and 5b is set to be slightly larger than the width W1 of the grooves 3a, 3b, 3c, and 3d so that solder sucked up through the grooves 3a, 3b, 3c, and 3d can remain therein by surface tension without flowing back into the grooves 3a, 3b, 3c, and 3d.

The solder guides 6a and 6b extend along the grooves 3a, 3b, 3c, and 3d from the edge 2a of the blade section 2 to the through-holes 5a and 5b, are open to the B-surface and the F-surface, and work such that solder sucked up through the solder guides 6a and 6b is collected to be stored in the through-holes 5a and 5b. For example, a solder bridge with a large amount of solder is melted and sucked up into the solder guides 6a and 6b by capillary action, then is collected to be stored in the through-holes 5a and 5b by the surface tension.

A sixth embodiment of the present invention will be explained by FIGS. 6A to 6C.

Figure 6A:
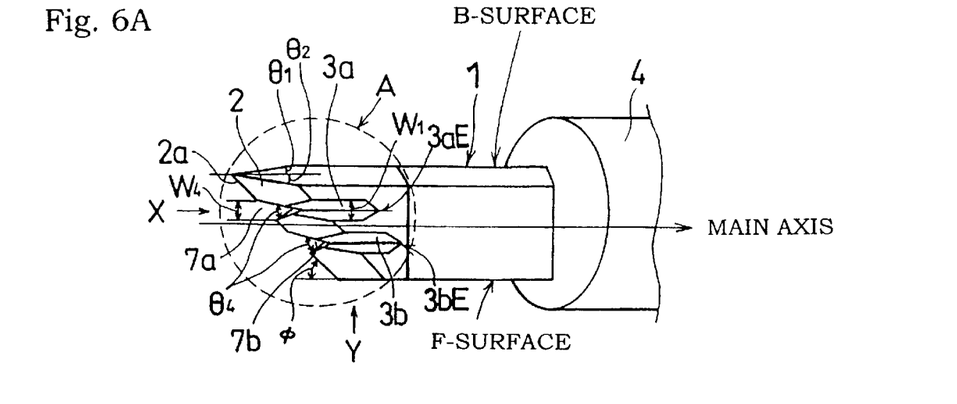
FIG. 6A is an external perspective view of a tip 1 and a heater section 4.
Figure 6B:
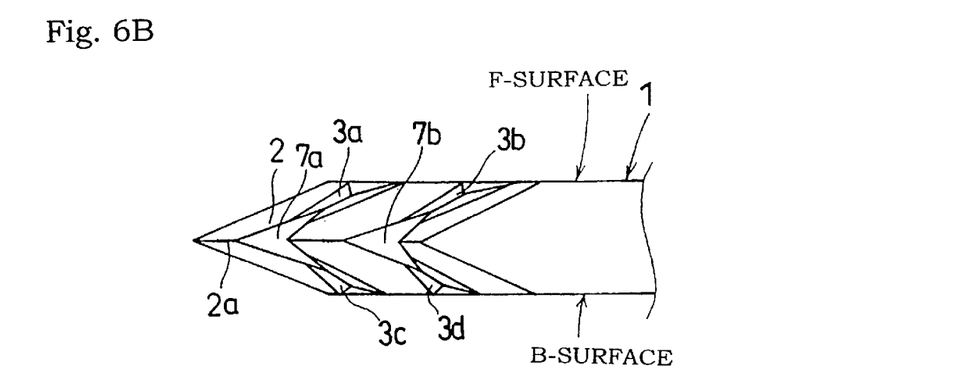
FIG. 6B is an enlarged view of Section A shown in FIG. 6A as viewed from the Y-direction.
Figure 6C:
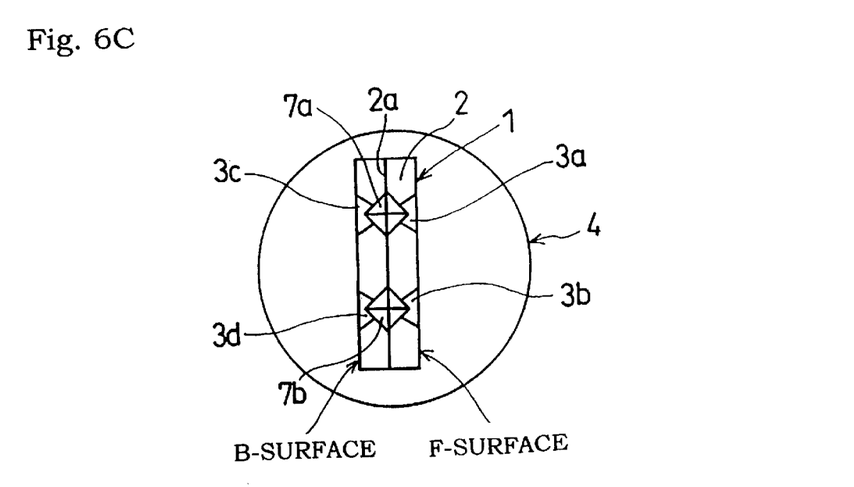
FIG. 6C is an enlarged view of Section A shown in FIG. 6A as viewed from the X-direction.

In FIGS. 6A to 6C, the same components as those in FIGS. 2A to 2C are denoted by the same reference numerals, and descriptions thereof are omitted. The sixth embodiment is different from the second embodiment per FIGS. 2A to 2C in that grooves 3a, 3b, 3c, and 3d are provided with V-shaped notches 7a and 7b extending from an edge 2a of a blade section 2. A width W4 of the V-shaped notches 7a and 7b at the edge 2a of the blade section 2 is substantially equal to the width W1 of the grooves 3a, 3b, 3c, and 3d, and a vertex angle θ4 of the V-shaped notches 7a and 7b is within the range of 90° to 120° so that melted solder can be promptly sucked up into the V-shaped notches 7a and 7b by capillary action.

Since the grooves 3a, 3b, 3c, and 3d are provided with the V-shaped notches 7a and 7b extending from the edge 2a of the blade section 2, the follow result can be achieved. Since the edge 2a of the blade section 2 has angles θ1 and θ2, melted solder bridge is easily separated. The separated solder flows rapidly into the V-shaped notches 7a and 7b, and then is sucked up into the grooves 3a, 3b, 3c, and 3d by capillary action.

EXAMPLES

An example (first) of the fist embodiment will be described below. The electric power of the soldering iron is set at 50 W, the thickness W2 of the tip 1 is set at 2 mm, and the height H thereof is set at 5 mm. The tip 1 made of copper is plated with 250 μm of iron, and the portion of the tip 1 between the edge 2a and the point M positioned beyond the ends of the solder suction grooves 3a, 3b, 3c, and 3d closer to the handle is plated with a material having a good wettability such as solder or pure iron. The angles φ, θ3, θ1 and θ2 are set at 45°, 90°, and 30°, respectively. The grooves 3a and 3c are formed to be positioned opposite to each other at a place 0.5 mm upward away from the center of the height dimension H, and the grooves 3b and 3d at a place 0.5 mm downward away therefrom. The width W1 and length of the grooves 3a, 3b, 3c, and 3d are 1 mm and 5 mm, respectively. The one ends 3aS, 3bS, 3cS, and 3dS of the solder suction grooves 3a, 3b, 3c, and 3d located farther from the handle do not reach the edge 2a of the blade section 2.

An example (second) of the second embodiment will be described below. The second example is different from the first example in that the grooves 3a, 3b, 3c, and 3d are longer and reach the edge 2a of the blade section 2 and in that the angles θ1 and θ2 at the edge 2a of the blade section 2 are smaller than those in the first example. Otherwise, the second example is the same as the fifth example, and therefore descriptions thereof are omitted. The length L of the blade section 2 is 5 mm, the length of the grooves 3a, 3b, 3c, and 3d is 10 mm, and the angles θ1 and θ2 are both 15°.

An example (third) of the third embodiment will be described below. The third example is different from the first and second examples in that the angles θ1 and θ2 at the edge 2a are different from each other and that while the one ends 3cS and 3dS of the grooves 3c and 3d positioned farther from the handle do not reach the edge 2a of the blade section 2, the one ends 3aS and 3bS of the grooves 3a and 3b positioned farther from the handle reach the edge 2a. Otherwise, the third example is the same as the first and second examples, and therefore descriptions thereof are omitted. The angles θ1 and θ2 at the edge 2a are 30° and 15°, respectively. The length of the grooves 3a and 3b is 10 mm, and the length of the grooves 3c and 3d is 5 mm.

An example (fourth) of the fourth embodiment will be described below. The fourth example is different from the second example in that the through-holes 5a and 5b are formed at the ends 3aE, 3bE, 3cE, and 3dE of the grooves 3a, 3b, 3c, and 3d positioned farther from the handle. Otherwise, the fourth example is the same as the second example, and therefore descriptions thereof are omitted. The diameter of the cylindrical through-holes 5a and 5b is 1.5 mm.

An example (fifth) of the fifth embodiment will be described below. The fifth example is different from the fourth example in that the grooves 3a, 3b, 3c, and 3d are provided with the solder guides 6a and 6b. Otherwise, the fifth example is the same as those in the fourth example, and therefore descriptions thereof are omitted. The width W3 of the solder guides 6a and 6b is 0.8 mm.

An example (sixth) of the sixth embodiment will be described below. The sixth example is different from the second example in that the solder suction grooves 3a, 3b, 3c, and 3d have the V-shaped notches 7a and 7b at the edge 2a of the blade section 2. Otherwise, the sixth example is the same as the second example, and therefore descriptions thereof are omitted. The width W4 at the edge 2a is 1 mm, and the vertex angle θ4 of the V-shaped notches 7a and 7b is approximately 90°.

In the above first to sixth embodiments shown in FIGS. 1A to 6C, the grooves, the V-shaped notches formed at the edge, the cylindrical through-holes, and the solder guides may be differently combined, for example, such that the grooves are formed on either of the F-surface and the B-surface of the tip 1 depending on the electric power of the soldering iron, that the number of the grooves formed on one side surface of the tip 1 is different from that of the solder suction grooves formed on the other side surface depending on the electric power of the soldering iron, that the grooves may be proportionally arranged in the blade section 2 in the tip 1 depending on the electric power of the soldering iron, or that the solder suction grooves are U-shaped or arc-shaped instead of V-shaped depending on the electric power of the soldering iron and the viscosity of solder to be used.

The through-holes may be formed in the first, second, and third embodiments as well as in the fourth embodiment The solder guides may be formed in the fist, second, third, and fourth embodiments as well as in the fifth embodiment According to the first aspect of the present invention, a soldering iron is provided which can easily perform both soldering work and removal of solder bridge even when using lead-free solder with a high-melting-point.

According to the second aspect of the present invention, a soldering iron is provided which can suck up excess solder of solder bridges to both sides, and therefore can more reliably prevent any solder bridges from forming again compared with the grooves being formed on one side surface only.

According to the third aspect of the present invention, a soldering iron is provided which can perform soldering work even in a narrow area between leads in an integrated circuit by applying a side surface having a smaller angle to solder.

According to the fourth aspect of the present invention, a soldering iron is provided in which melted solder rapidly flows into the V-shaped notches, whereby the capillary action in the groove is more effectively exerted, and the solder is more promptly sucked.

According to the fifth aspect of the present invention, a soldering iron is provided in which a larger amount of solder can be sucked up by surface tension compared with when the cylindrical through-holes are not formed.

According to the sixth aspect of the present invention, a soldering iron is provided which can simultaneously suck up all the solder of soldering bridges laid between a plurality of lead terminals in an integrated circuit, whereby the working efficiency is improved, and unnecessary thermal stress is not put on a semiconductor and a substrate enhancing the product reliability.

According to the seventh aspect of the present invention, soldering iron can be suitably used in accordance with the electric power of the soldering iron and with the viscosity of the solder, whereby the working efficiency is improved and the product reliability is enhanced.

According to the eighth aspect of the present invention, a soldering iron is provided which promotes suction of solder into the grooves by capillary action.

According to the ninth aspect of the present invention, a soldering iron is provided which sucks up a larger amount of solder, enhances the effect of the capillary action in the groove, and promotes the suction of the solder compared with when the solder guides and the through-holes are not formed.

What is claimed is:

1. A structure of a soldering iron tip, including a cutter blade-shaped portion having a straight-line edge inclined with respect to a main axis directed parallel to a length of a soldering iron handle, and grooves formed on both side surfaces thereof and directed parallel to said main axis.

2. A structure of a soldering iron tip according to claim 1, wherein said grooves formed respectively on said both side surfaces are positioned opposite to each other.

3. A structure of a soldering iron tip according to claim 1, wherein two angles each defined between said main axis and each of two inclined surfaces constituting said cutter blade-shaped portion are different from each other.

4. A structure of a soldering iron tip according to claim 1, wherein said grooves each have a V-shaped notch formed at said edge of said cutter blade-shaped portion.

5. A structure of a soldering iron tip according to claim 1, wherein two of said grooves positioned opposite to each other on said tip have in common a cylindrical through-hole as a solder reservoir formed to be continuous with their respective one ends closer to said handle.

6. A structure of a soldering iron tip according to claim 1, wherein a plurality of grooves are formed on each of said both side surfaces.

7. A structure of a soldering iron tip according to claim 1, wherein said grooves have one of V, U, and arc shapes in section.

8. A structure of a soldering iron tip according to claim 1, wherein said edge of said cutter blade-shaped portion inclined with respect to said main axis is plated such that plating covers an area beyond each of said grooves, and, in case of said cylindrical through-holes being provided, covers an area beyond each of said cylindrical through-holes.

9. A structure of a soldering iron tip according to claim 1, wherein said grooves each have a solder guide therealong.

* * * * *